(12) United States Patent
Wu et al.

(10) Patent No.: US 7,922,547 B2
(45) Date of Patent: Apr. 12, 2011

(54) ELECTRICAL CONNECTOR HAVING CONTACTS EACH WITH FREE GUIDING END

(75) Inventors: Chun-Kwan Wu, Tu-Cheng (TW); Chi-Nan Liao, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/467,233

(22) Filed: May 15, 2009

(65) Prior Publication Data

US 2009/0286428 A1  Nov. 19, 2009

(30) Foreign Application Priority Data

May 19, 2008  (TW) ................................ 97208673 U

(51) Int. Cl.
*H01R 4/48* (2006.01)
(52) U.S. Cl. ...................................................... 439/862
(58) Field of Classification Search .................. 439/862, 439/630
See application file for complete search history.

(56) References Cited

U.S. PATENT DOCUMENTS

| 5,885,090 | A | * | 3/1999 | Comstock et al. | ............. | 439/65 |
| 6,086,424 | A | * | 7/2000 | Chang | ............. | 439/630 |
| 6,361,359 | B1 | * | 3/2002 | Du et al. | ............. | 439/500 |
| 6,544,074 | B2 | * | 4/2003 | Bricaud et al. | ............. | 439/630 |
| 6,951,488 | B2 | * | 10/2005 | Hsieh | ............. | 439/660 |
| 7,037,113 | B2 | * | 5/2006 | Soh | ............. | 439/66 |
| 7,086,904 | B1 | * | 8/2006 | Kuan et al. | ............. | 439/630 |
| 7,115,005 | B2 | * | 10/2006 | Zhu et al. | ............. | 439/862 |
| 7,625,254 | B2 | * | 12/2009 | Zhang et al. | ............. | 439/862 |

FOREIGN PATENT DOCUMENTS

CN  2473774  1/2001

* cited by examiner

*Primary Examiner* — Neil Abrams
(74) *Attorney, Agent, or Firm* — Wei Te Chung; Andrew C. Cheng; Ming Chieh Chang

(57) ABSTRACT

The electrical connector includes an insulative housing (1) having a plurality of retention channels (13) extending to an exterior both in horizontal and vertical directions. Each contact (2) is laterally inserted into a corresponding channel (13) and has a free front header (214) with a horizontal retention piece (2141) and at least a side guiding section (2142). The side guiding section (2142) is configured to guide the free front header (214) into an interior of the channel (13) at a first initial insertion position, while the horizontal retention piece (2141) is pressed by a horizontal wall (146) of the channel (13) at a second full insertion position to hold the contact (2) in position. This configuration of the free front header (214) has the function of guiding the contact (2) into the channel (13) with no need of an installation tool.

8 Claims, 4 Drawing Sheets

US 7,922,547 B2

ELECTRICAL CONNECTOR HAVING CONTACTS EACH WITH FREE GUIDING END

BACKGROUND OF THE INVENTION

1. Field of the Invention

The present invention relates to electrical connectors, and more particularly, to an electrical connector having contacts each with a free guiding end for guiding the contacts into channels at an initial insertion position.

2. Description of Related Art

A conventional electrical connector found in CN Issue NO. 2473774 includes an insulative housing having a plurality of retention channels, and a plurality of contacts held in the respective retention channels. Each of the contacts has a free horizontal end pressed by a horizontal wall of a corresponding channel after the contact is fully inserted into the channel. At an initial insertion position, the contact is required to use an installation tool to downwardly press the contact to a height lower than a top face of the channel, and then be laterally inserted into an interior of the channel. This installation is complicated.

Therefore, an improved electrical connector is desired to overcome the disadvantage of the prior art.

SUMMARY OF THE INVENTION

An object, therefore, of the invention is to provide a new and improved electrical connector of the character described able to guide the contacts into the corresponding channels at an initial insertion position with no need of an installation tool.

In order to achieve the above-mentioned object, an electrical connector comprises an insulative housing, a plurality of contacts held by the housing, and a metallic shell assembled to the housing. The housing has a main body along a lengthwise direction, and a plurality of retention channels by two sides of the main body and extending along a front-to-back direction perpendicular to the lengthwise direction, with each of the retention channels extending to an exterior both in horizontal and vertical directions. The contacts are laterally guidably inserted into the corresponding channels along an inserting direction, respectively, each of contact defining a deflectable contacting section extending above the top face of the housing. The metallic shell is assembled upon the housing and includes a top plate cooperating with the top face to define a card receiving cavity therebetween. A free front header of each contact has a horizontal retention piece with thereof at least a side guiding section. The side guiding section is configured to guide the free front header into the channel at a first initial insertion position, while the horizontal retention piece is pressed by a horizontal wall of a front end of the channel at a second insertion position to hold the contact in position. This configuration of the free front header has the function of guiding the contact into an interior of the retention channel with no need of an installation tool, which is used in the prior art with two steps including a first step to initially press the contact downwardly by the tool and a second step to laterally insert the contact into the channel.

Other objects, advantages and novel features of the present invention will become more apparent from the following detailed description of the present embodiment when taken in conjunction with the accompanying drawings.

DETAILED DESCRIPTION OF THE INVENTION

Reference will now be made in detail to the preferred embodiment of the present invention.

Figure 1:
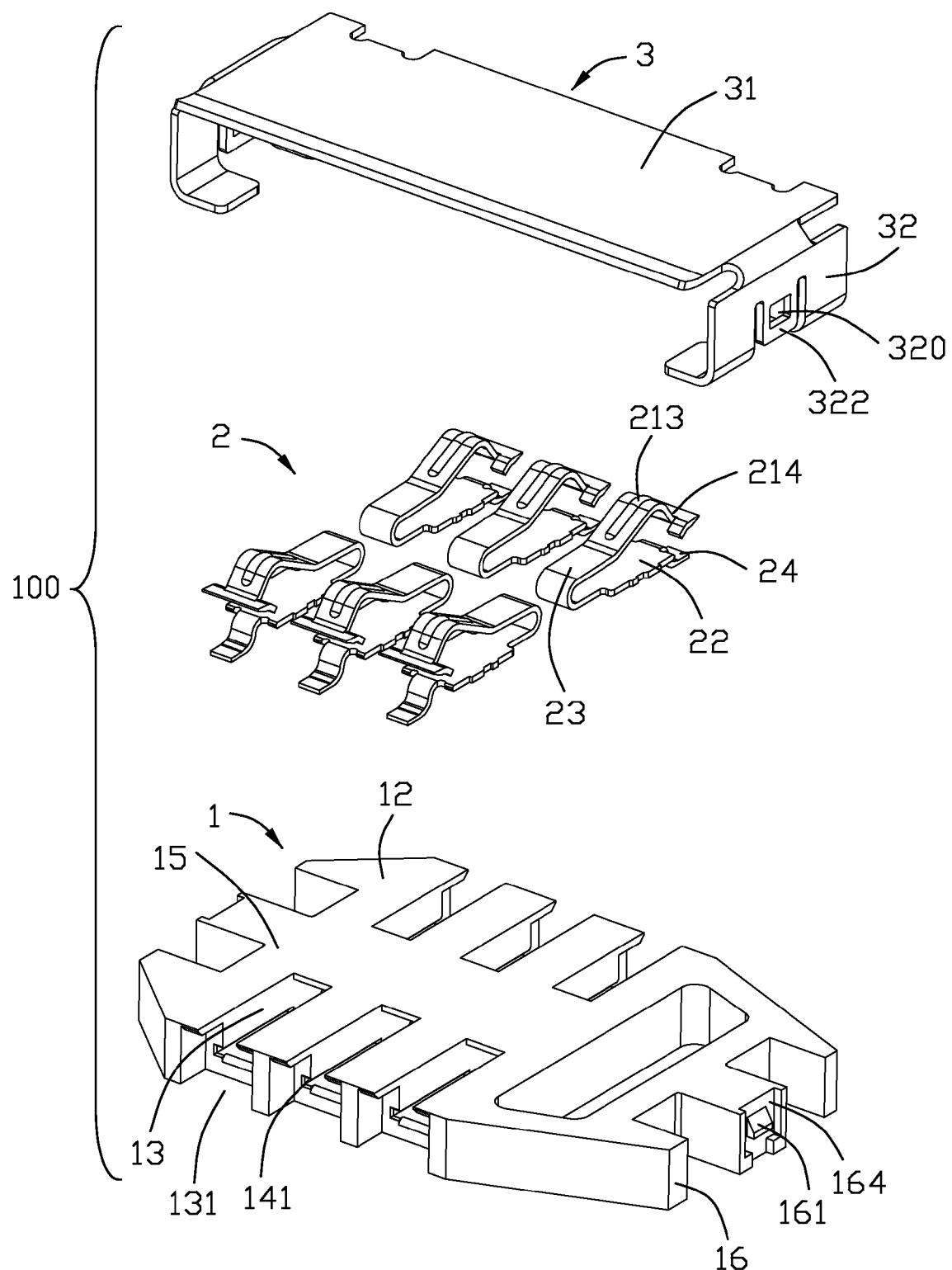
FIG. 1 is an exploded, perspective view of an electrical connector according to an embodiment of the present invention.
Figure 2:
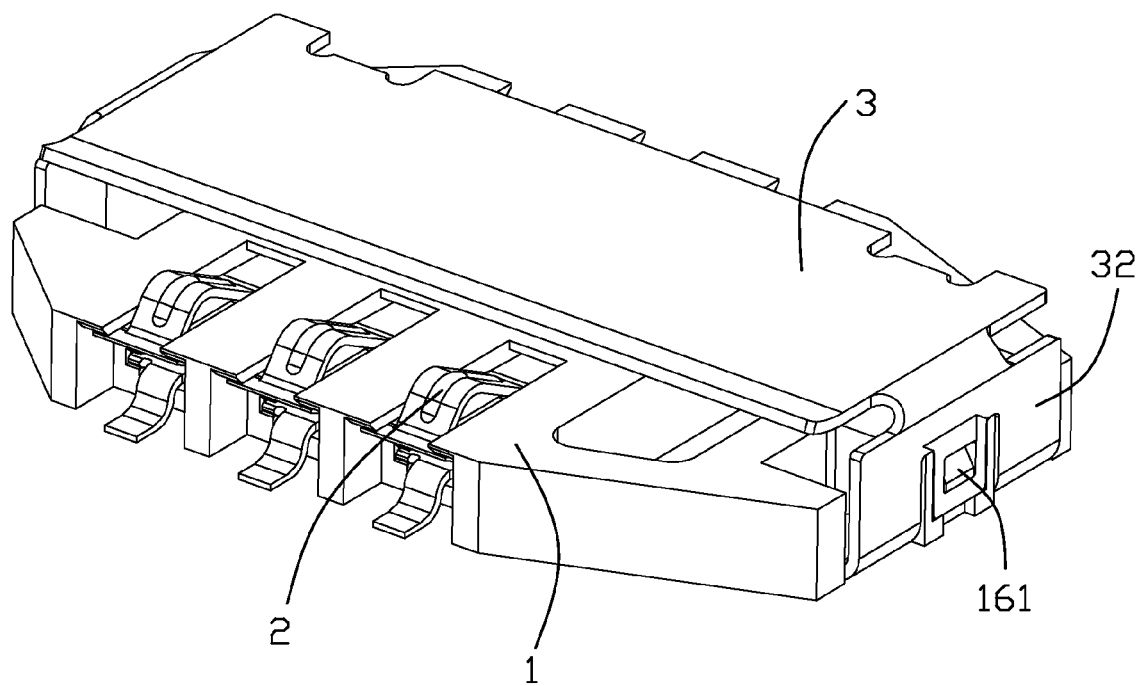
FIG. 2 is an assembled, perspective view of the electrical connector of FIG. 1.
Figure 3:
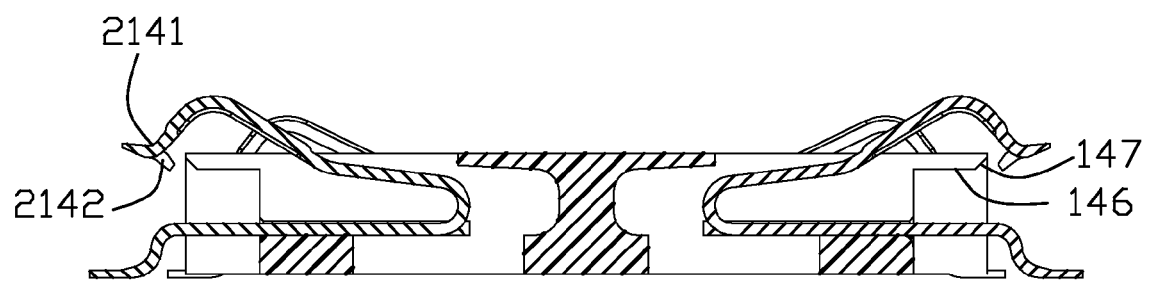
FIG. 3 is a cross sectional view showing contacts laterally inserted in respective channels at an initial insertion position.
Figure 4:
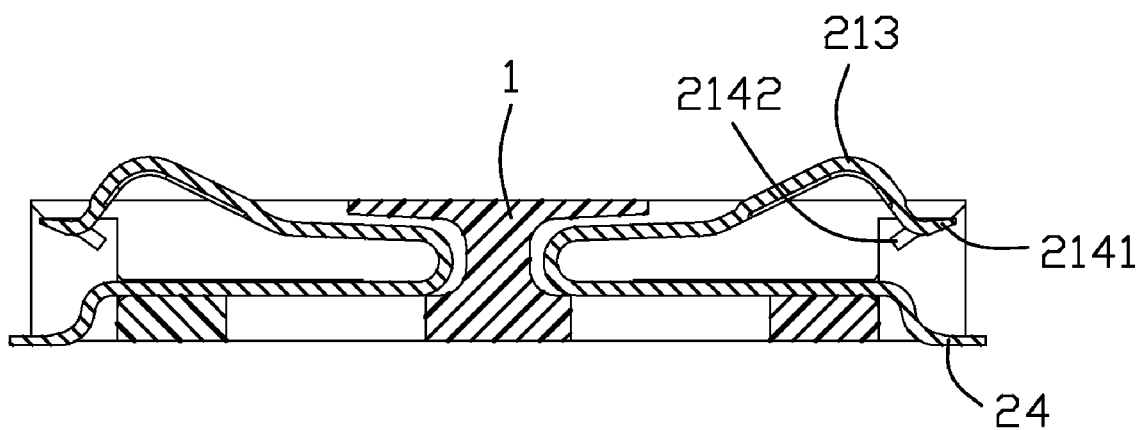
FIG. 4 is a cross sectional view showing contacts laterally inserted in respective channels at a full insertion position.

Referring to FIGS. 1-4, an electrical connector 100 according to an embodiment of the present invention is shown to include an insulative housing 1, a plurality of contacts 2 held by the insulative housing 1, and a metallic shell 3 assembled onto the housing 1.

The insulative housing 1 has a main body 12 along a lengthwise direction, a plurality of retention channels 13 by two sides of the main body 12 and extending along a front-to-back direction perpendicular to said lengthwise direction. Each of the retention channels 13 extends to an exterior both in horizontal and vertical directions. A front insertion opening 131 is located at a front end of each channel 13, with a width of the front insertion opening 131 being larger than that of the channel 13. The front insertion opening 131 is formed with a pair of slanted side edge walls 147, which are configured to guiding a free front header 214 into the channel 13 at a first initial insertion position.

The metallic shell 3 is assembled upon the housing 1 and includes a top plate 31 cooperating with the top face 15 of the housing 1 to define a card receiving cavity therebetween for receipt of a card inserted thereinto. The metallic shell 3 has two opposite side plates 32 engageable with two side walls 16 of the insulative housing 1 so as to assemble the shell 3 to the insulative housing 1. In this embodiment of FIG. 1, each of the side plates 32 has a rigid piece 322 with a through slot 320 defined thereon, each of the side walls 16 has a recessed region 164 with an outward protrusion 161, the rigid piece 322 is downwardly inserted into the recessed region 164 with the outward protrusion 161 engaged into the through slot 320 so as to securely assemble the shell 3 to the housing 1.

Each of contacts 2 is laterally guidably inserted into a corresponding channel 13 along an inserting direction, respectively. Each contact 2 has a horizontal retention section 22 retained a bottom slot 141 of the channel 13, a surface mount tail 24 extending from one end of said horizontal retention section 22, a connecting arm 23 extending from an opposite end of said horizontal retention section 22 and has a portion arranged substantially parallel to said horizontal retention section 22, the free front header 214 located opposite to the surface mount tail 24, and a deflectable contacting section 213 arranged between said portion of the connecting arm 23 and said free front header 214. The deflectable contacting section 213 extends above a top face 15 of the housing 1 for engagement with an electrical card inserted into the electrical connector 100.

The free front header 214 of each contact 2 has a horizontal retention piece with thereof at least a side guiding section. In this embodiment of FIG. 1, the free front header 214 has a horizontal retention piece 2141 with a pair of slanted engagement pieces 2142 by two sides of the horizontal retention piece 2141. The slanted engagement pieces 2142 are configured to guide the free front header 214 by the corresponding slanted edge walls 147 of the front insertion opening 131 into an interior of the channel 13 at a first initial insertion position shown in FIG. 3, while the horizontal retention piece 2141 is pressed by a horizontal wall 146 of the front insertion opening 131 at a second full insertion position shown in FIG. 4 to securely hold the free front header 214 in position by the housing 1. This configuration of each free front header 214 provides a first slanted part for guiding the header 214 into the interior of the channel 13 at the first initial position of FIG. 3, and a second horizontal part, discrete from the first slanted part, for holding the free front header 214 in position at the second full insertion position of FIG. 4 to enable the contact sections 213 of the contacts 2 to define a common planar mating interface. In the prior art, every two adjacent deflectable contact sections 213 of the contacts 2 may be floatable in two different levels, having the possibility of defining no common planar mating interface. This configuration of the free front header 214 has the function of guiding the contact 2 into an interior of the retention channel 13 with no need of an installation tool, which is used in the prior art with two steps including a first step to initially press the contact downwardly by the installation tool and a second step to laterally insert the contact into the channel.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical connector comprising:
   an insulative housing defining a contact insertion face and a mating face;
   a plurality of passageways formed in the housing and upwardly extending through said contact insertion face;
   an engagement region formed in each of said passageways proximate the contact insertion face;
   a plurality of contacts disposed in the corresponding passageways respectively, each of said contacts defining a retention section retaining the contact in the corresponding passageway, and a mounting tail extending from the retention section, a connecting arm extending from the retention section, a contact section extending from the connecting arm opposite to said retention section, and a slanted engagement piece formed around a distal longitudinal end of the contact section in a longitudinal direction thereof; wherein
   said contact is initially inserted into the corresponding passageways, respectively, from the contact insertion face under condition that the contact section is under a relaxed manner so as to have the contact section extend beyond the mating face with a first distance, and successively said contact section is under a deflected/preloaded manner to have the contact section extend beyond the mating face with a second distance smaller than the first distance, via engagement between the slanted engagement piece and the engagement region during further insertion of the contact into the corresponding passageway; wherein
   no addition tool is required to deflect the contact section but only via insertion of the contact into the passageway; wherein
   each of said contacts includes a horizontal retention piece at the distal longitudinal end, and said horizontal retention piece defines an inner edge under condition that said contact section upwardly, inwardly and obliquely extends from a middle region of said inner edge while the slanted engagement piece downwardly, inwardly and obliquely extends from a lateral side region of said inner edge; wherein
   the horizontal retention piece abuts against the housing for preloading when the contact is fully assembled into the corresponding passageway.

2. The electrical connector as claimed in claim 1, wherein the slanted engagement piece is located on a lateral side of the contact section in a lateral direction perpendicular to said longitudinal direction.

3. The electrical connector as claimed in claim 2, wherein said engagement region is located by the lateral side of the contact section.

4. The electrical connector as claimed in claim 1, wherein said mating face is directed upward and the contact insertion face is directed sideward.

5. The electrical connector as claimed in claim 1, wherein said retention section extends in a horizontal direction.

6. The electrical connector as claimed in claim 1, further including a metallic cover attached to the housing and cooperating with the mating face to define a receiving cavity therebetween.

7. The electrical connector as claimed in claim 1, wherein the engaging region and the slanted engaging piece are generally aligned above the mounting section.

8. An electrical connector comprising:
   an insulative housing defining a contact insertion face and a mating face;
   a plurality of passageways formed in the housing and upwardly extending through said contact insertion face;
   an engagement region formed in each of said passageways proximate the contact insertion face;
   a plurality of contacts disposed in the corresponding passageways respectively, each of said contacts defining a retention section retaining the contact in the corresponding passageway, and a mounting tail extending from the retention section, a connecting arm extending from the retention section, a contact section extending from the connecting arm opposite to said retention section, and a pair of slanted engagement pieces formed around a distal longitudinal end of the contact section in a longitudinal direction thereof; wherein
   said contact is initially inserted into the corresponding passageways, respectively, from the contact insertion face under condition that the contact section is under a relaxed manner so as to have the contact section extend beyond the mating face with a first distance, and successively said contact section is under a deflected/preloaded manner to have the contact section extend beyond the mating face with a second distance smaller than the first distance, via engagement between the slanted engagement piece and the engagement region during further insertion of the contact into the corresponding passageway; wherein
   no addition tool is required to deflect the contact section but only via insertion of the contact into the passageway; wherein
   each of said contacts includes a retention piece at the distal longitudinal end, and said retention piece defines an inner edge under condition that said contact section upwardly, inwardly and obliquely extends from a middle region of said inner edge while said pair of slanted engagement pieces downwardly, inwardly and obliquely extend from two opposite lateral side regions of said inner edge so that a lateral dimension of said retention piece is essentially equal to a sum of that of the contact section and those of the slanted engagement pieces in a lateral direction perpendicular to said longitudinal direction; wherein
   the retention piece abuts against the housing for preloading when the contact is fully assembled into the corresponding passageway.

\* \* \* \* \*